June 2, 1964   A. R. BORN   3,135,166
SWASH PLATE MOTOR
Filed June 22, 1961   2 Sheets-Sheet 2
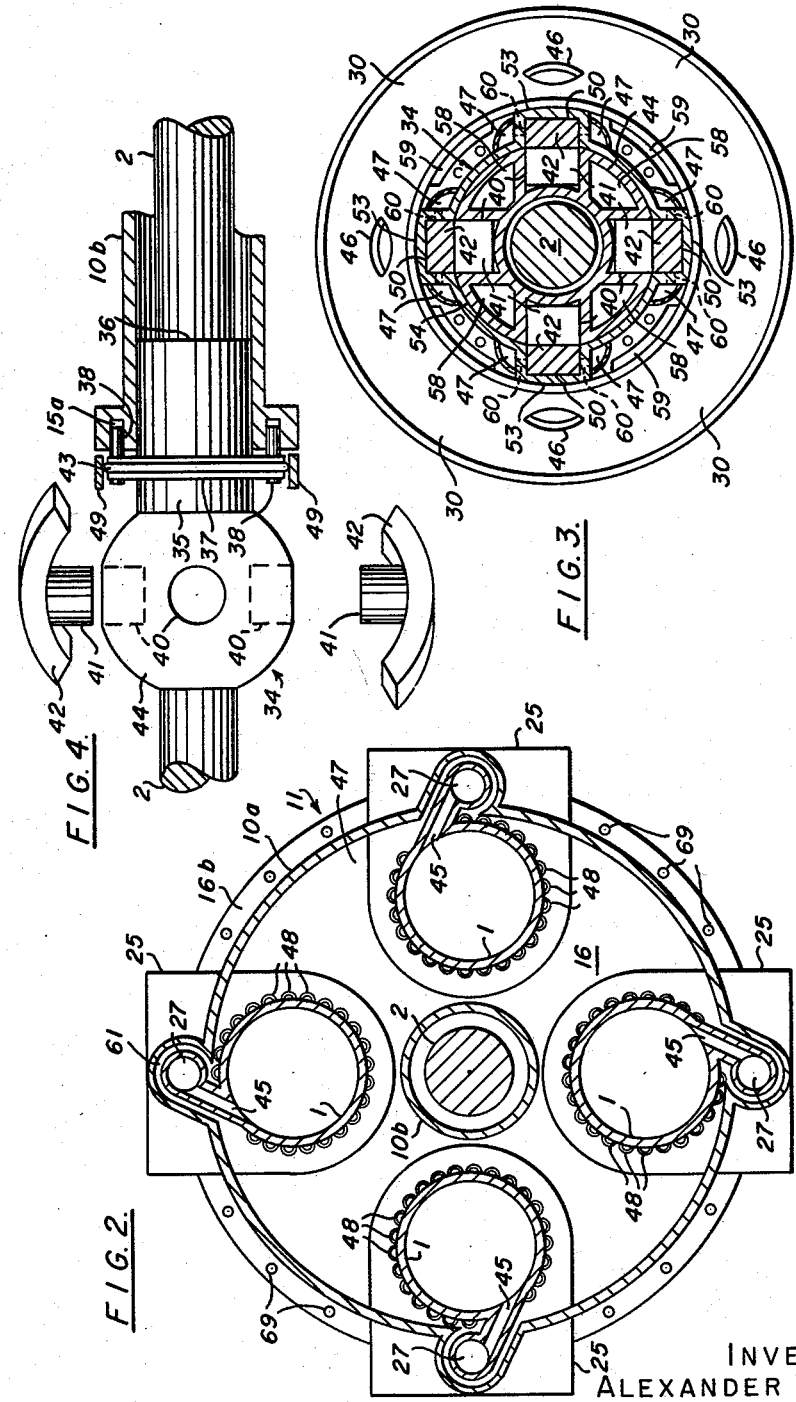
INVENTOR
ALEXANDER R. BORN
BY Fetherstonhaugh + Co.
ATTORNEYS

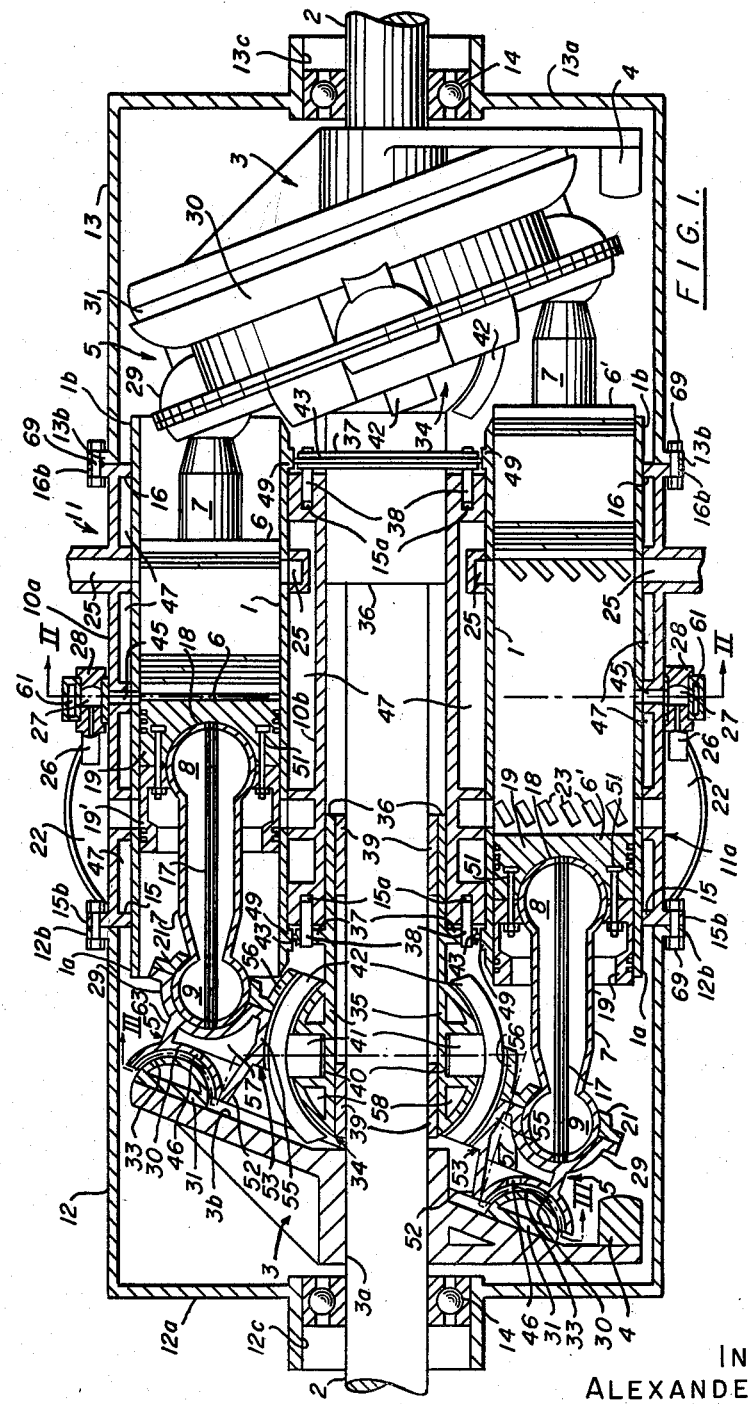

United States Patent Office 3,135,166
Patented June 2, 1964

3,135,166
SWASH PLATE MOTOR
Alexander R. Born, 17 John St. S., Aylmer,
Ontario, Canada
Filed June 22, 1961, Ser. No. 118,882
6 Claims. (Cl. 91—175)

This invention relates to a swash plate motor.

The trend in piston type internal combustion engines has been to shorten the piston stroke in order to increase the operating efficiency of the engine and to reduce piston and piston ring wear. The increased efficiency of the engine having a short piston stroke is due mainly to improved breathing and combustion characteristics as the engine is accelerated and operated at high speeds.

The pistons of an engine having a long piston stroke travel a greater distance than a short stroke piston during each revolution of the power shaft, and thus attain a much higher speed at a given r.p.m. A higher rate of wear caused by the friction between the piston and the cylinder exists due to the higher piston speeds and greater distance travelled. The friction acting along a longer distance for every stroke also results in a greater frictional power loss per stroke. Since the piston and piston rod of a long stroke engine must accelerate to a higher speed during each stroke, greater forces develop in these parts and make it necessary to design them to withstand the higher forces.

In the conventional type engine utilizing a crankshaft to transform the reciprocating piston motion into a usable rotary motion, the throw of the crank is equal to one half of the piston stroke. The ratio of the crank throw to the piston stroke is fixed in the engines employing a crank shaft, and since the output torque of the engine decreases as the throw of the crank decreases, the torque is sacrificed when the piston stroke is shortened.

In known types of swash plate engines, the stroke of the piston can be shortened by decreasing the diameter of the inclined swash plate fixed to the power shaft and by increasing the size of the acute angle between the inclined swash plate and the shaft. However, the output torque of known types of swash plate engines is decreased if the piston stroke is shortened as in the case of the conventional crankshaft type engine since the output torque decreases as the diameter of the plate decreases and as the acute angle increases.

Although a gas turbine engine can be designed to produce a high torque at a high speed, it is not practical to operate it over a large range of operating conditions because the efficiency of the engine and the output torque drop off rapidly as the speed is reduced from its optimum running speed.

The present inventor has found that an advantageous balance between short stroke and torque output can be obtained in a swash plate engine by providing an eccentric annular guideway on the inclined swash plate surrounding the power shaft and by providing a connecting means which is universally attached, on the one hand with the inner ends of the piston rods, engaging, on the second hand, said guideway, on the third hand, being universally journalled on the power shaft, and, on the fourth hand, being held against rotation about the axis of the power shaft in relation to the cylinders, whereby the linear reciprocating movement of the pistons of the motor is related to the rotational movement of the power shaft.

Preferably, the annular guideway has a convex guiding surface adapted for cooperative engagement with an annular concave surface of the connecting means.

The engine may be an opposed piston type in which the reciprocating linear motion of the opposed pistons is related to the rotary movement of the power shaft through connecting means, swash plates and eccentric annular guideways arranged at opposite ends of the cylinders.

The following is a description of one embodiment of the invention, by way of example, reference being had to the following drawings in which:

FIGURE 1 is a side elevation view, partially in section of an opposed piston motor utilizing the swash plate and connecting means arrangement;

FIGURE 2 is a sectional view of the cylinders and power shaft the section being taken along line II—II of FIGURE 1;

FIGURE 3 is a view taken along line III—III of FIGURE 1 showing the universal mounting means in section; and FIGURE 4 is a partially exploded view of a portion of the universal mounting means.

In FIGURE 1, reference numeral 2 denotes a power shaft mounted for rotation in the housing 11 of an opposed piston motor. A plurality of cylinders 1 are disposed about and in parallel relationship to the power shaft 2. Pistons 6, 6 and 6', 6' are shown arranged in the cylinders 1, 1 in an opposed manner and are provided with piston rods 7. Fixed to the power shaft 2 adjacent the ends 1a and 1b of the cylinders 1 are swash plates 3 which are inclined towards each other. The forces developed in the cylinders by the gases between the pistons are transmitted through the piston rods 7, and to annular guideways 31 mounted on the swash plates 3 in eccentric relationship to the power shaft 2 by way of connecting means 5 situated between the outer ends of the piston rods and the swash plates. The power shaft 2 is thus urged to rotate through the action of the connecting means 5 on the annular guideways 31.

In the embodiment of the motor shown in the drawings, four cylinders 1 are utilized. The longitudinal axis of the cylinders extend parallel to the power shaft 2, and the cylinders are spaced equidistantly therefrom. The housing 11 consists of a central portion 11a and two end housing portions 12 and 13. The central portion 11a includes an outer cylindrical shaped member 10a and an inner tubular member 10b. The outer member 10a surrounds the cylinders 1 and is located coaxially with respect to the power shaft 2. The inner tubular member 10b surrounds the power shaft 2 and is coaxially arranged in relation to it. Annular end plates 15 and 16 are welded to the outer ends of the outer member 10a and the tubular member 10b. The end portions 1a and 1b of the cylinders 1 extend through the plates 15 and 16 and are formed integrally with or welded thereto. Thus a chamber 47 is formed about the cylinder and serves as a coolant jacket through which a fluid can be circulated.

The plates 15 and 16 extend outward past the cylindrical member 10a to provide annular flanges 15b and 16b, respectively, to which flanges 12b and 13b of housing members 12 and 13, respectively, are secured by bolts 69 (see FIGURES 1 and 2). The housing members 12 and 13 having end plates 12a and 13a provide enclosures for the outer ends 1a and 1b of the pistons, swash plates 3 and connecting means 5. The power shaft 2 is mounted in bearings 14 which are located in openings 12c and 13c in the end plates 12a and 13b.

In describing the construction and operation of the motor, reference is often made only to the pistons 6, 6', piston rod 7, connecting means 5, unversal mounting means 34 and swash plate 3 shown in section at the left hand side of FIGURE 1 since the opposed elements appearing at the right hand side of FIGURE 1 are identical to them. The pistons 6, 6' consist of two sections, head section 19 and skirt section 19' which are secured together by bolts and nuts 51. The head portion 19 of the piston is provided with a hemispherical socket 18 which receives a ball portion 8 formed at one end of the piston rods 7. The ball portion 8 of the piston rod is held in contact with the hemispherical socket by the skirt portion 19', which is bolted onto the head portion 19 after the ball portion 8 has been located in the spherical socket 18. Thus, a universal connection is achieved between the piston rods and the piston. In the embodiment of the invention shown in the drawings, the piston rods 7 are formed of sheet metal and are provided with a oil passage 17 which permits oil to flow from the outer end of the rod to the ball and socket joint in the piston.

Power shaft 2 extends through a circular hole 3a in the swash plate 3, and the swash plate is held against rotation with respect to the shaft 2. The circular faces 3b of the two swash plates are inclined towards each other and are eccentrically arranged in relation to the power shaft 2. Secured to the face 3b of the swash plate is an annular guideway 31. The guideway 31, which has a convex surface 30, is also eccentric with respect to the longitudinal axis of the power shaft 2. Weights 4 are provided on the swash plate to counterbalance the eccentric portion of the plates and prevent vibration when the shaft is rotating.

A sleeve member 35 which forms part of the universal mounting means 34 is journalled by way of journal bearings 39 on the power shaft 2 and the end 36 of the sleeve 35 fits snugly into the end of tubular member 10b. An annular flange 37 is fixed to the sleeve 35 adjacent the end of the tubular member 10b. A plurality of pins 38, which extend in the same direction as the power shaft, are welded into holes in flange 37, and project into holes 15a in the plate 15, and thus, prevent the sleeve 35 from turning with respect to the cylinders 1 and housing 11 but permit the sleeve to slide longitudinally along the power shaft 2 on journal bearings 39.

The universal mounting means 34 has a spherical bearing surface 44 (see FIGURES 1, 3 and 4). The spherical bearing member 34 is fixed to the sleeve 35 and is provided with four radially disposed cylindrical sockets 40. The sockets 40 are spaced at 90° about the spherical bearing surface 44, and the longitudinal axis of the sockets 40 extend in radial directions in relation to the power shaft 2. Four arcuate shaped bar members 42 having the same curvature as the spherical bearing surface 44 fit over the bearing surface. The bar members are provided with stub shafts 41 which are fixed in radial relationship thereto. The stub shafts 41 fit into the cylindrical sockets 40 and thus permit the bar members 42 to swivel on the spherical bearing surface 44.

The connecting means 5 is provided with an annular concave bearing surface 30 which is shaped to engage the convex surface of the guideway 31. The concave bearing surface 30 is connected concentrically to a concave socket member 53 by cylindrical flange 52 (see FIGURES 1 and 3). The concave socket member 53 has an inner bearing surface 54 (see FIGURE 3) which engages the spherical bearing surface 44, thus forming a ball and socket combination. The socket member 53 comprises two separate sections 55 and 56 which are secured together after they have been assembled over the spherical bearing surface 44 (see FIGURE 1). The socket member 52 is provided with four grooves 50 extending in the same direction as the power shaft 2 and which have the same shape and cross section as the bars 42 so as to permit sliding movement of the grooves 50 in relation to the bars 42. The bars 42 prevent the connecting means 5 from rotating with respect to the cylinders 1 and housing 11 but allow it to move universally on the spherical bearing surface 44.

Opposite to the outer ends of each of the cylinders, the connecting means 5 has hemispherical sockets 29. Web members 63 are fixed between the socket 29 and the annular bearing surface 33 to stiffen the connecting means 5 and to provide lubrication chambers 57. The ball portions 9 of the outer end of the piston rods 7 are held in engagement with the socket 29 by cap members 21. Ball 9 and socket 29 combination permit the outer ends of the piston rods to describe universal movement with respect to the connecting means 5.

Lubricating oil is forced from a main gallery in the power shaft 2 (not shown) through the cavities 58 in the universal mounting means 34 and into oil chambers 59 (see FIGURE 3) surrounding the concave socket member 53. From the oil chamber 59 it can flow by passages (not shown) into the oil chamber 47 and oil passages 60 into the groove 50 in the concave socket member 53 (see FIGURE 3). The oil under pressure in the oil chamber 59 is also free to pass through apertures (not shown) into cavities 57, and thus, through holes 46 to provide a cushion of oil between the guideway 31 and the connecting means 5. From the cavities 57 oil also passes through apertures not shown into the socket 29 and through passages 17 in the piston 7 to lubricate the ball 8 and socket 18 connection and the cylinder walls.

The annular flange 37 on the sleeve 35 is surrounded by a coaxial cylindrical portion 49 which projects from the plate 15 and the flange is provided with a seal 43 between the cylindrical portion 49 and its outer periphery. Oil is admitted under pressure to the annular area 61 between the flange 37 and the plate 15, and urges the flange 37 and the sleeve 35 towards the swash plate 3 to ensure proper engagement between guideway 31 and concave surface 30 regardless of wear of the parts.

Each cylinder 1 is provided with a plurality of air intake ports 23 which are uncovered by the pistons at the right hand side of the motor as seen in FIGURE 1 when the pistons reach the outer end of their stroke. At the opposite end of each cylinder, exhaust ports 24 are uncovered as the opposed pistons reach the end of its stroke. The exhaust fluid flows out through the ports 24 and the individual exhaust chambers 25 encircling each cylinder. The chambers 25 extend through the housing 10 and permit the exhaust fluid to leave the motor. Coolant passages 48 (see FIGURE 2) extend through the chamber 25 adjacent the cylinder between the ports 24 to aid in maintaining an even cylinder wall temperature.

A precombustion chamber 27 is located on the outer housing 10a adjacent each cylinder 1 and each is connected to the adjacent cylinder by passages 45 entering the cylinder at a point which is midway between the opposite ends of the cylinder. A fuel injection nozzle 26, which is connected to a properly timed pump (not shown), is located opposite to a glow plug 28 so that the fuel which is discharged into the chamber 27 by the nozzle 26 strikes the plug 28 before entering the cylinder to provide a more instantaneous combustion. The passages 45 are substantially tangential to the cylinder walls to generate a whirling motion in the cylinder. Coolant passages 61, which are connected to the main cooling chamber 47, surround the precombustion chambers 27 to prevent the precombustion from causing overheating of the chambers 27.

In operation, the new charge of air in the cylinder 1 shown at the top of FIGURE 1 has been compressed by the pistons 6, 6 moving to the position shown. Fuel under pressure is discharged from the nozzle 26 into the chamber 27. A portion of the discharged fuel is ignited by the glow plug 28 and the mixture of fuel and burning fuel pass by way of passage 45 into the mass of compressed air between the two pistons. The angle between the passage 45 and the cylinder wall causes turbulence in the cylinder so that the fuel mixes readily with the compressed air and continues to burn evenly. As the combustion continues to take place in the cylinders, the pistons are forced apart by the expanding gases until they reach the position of the pistons 6', 6' shown at the bottom of FIGURE 6. At this point the ports 23 and 24 have been uncovered and the supercharged air in chest 22 rushes in through ports 23 and forces the exhaust gases out through ports 24. The pistons then reverse their direction to begin the compression of the new charge of air, and thus, repeat the same cycle over again. Each set of opposed pistons go through a cycle as described above in succession in the direction of rotation of the power shaft 2 per revolution of the power shaft.

The force produced by the burning gases in the cylinder is transmitted through the piston rods 7 to the connecting means 5. The force is then transferred by the connecting means 5 to the eccentric guideway 31 at a section of the guideway opposite to the end of the respective cylinder. Due to the inclined nature of the plate 3 and guideway 31, a turning force or torque is applied to the shaft 2. The entire area of the annular concave bearing surface 30 of the connecting means 5 is in constant engagement with the entire area 33 of the annular convex surface of the eccentric guideway since the connecting means 5 is free to swivel in all directions on the universal mounting means 34. The connecting means 5 is prevented from turning, however, by the bar members 42 anchored in the universal mounting means 34 which in turn is held against rotation by the pins 38 extending into the holes 15b of plate 15. Thus, the guideway 31 slides within the concave bearing surface 33. Due to the shape of the universal mounting means 34 in relation to the eccentric guideway 31, the convex surface 33 and concave surface 30 are always in complete engagement, as stated above, and are in concentric relationship with respect to each other. As the piston 6 shown at the top of FIGURE 1 moves outwardly, the portion of the concave surface 30, which is immediately adjacent the ball 9 and socket 29 combination of this piston, continuously engages a portion of the eccentric annular guideway which is closer and closer to the shaft 2, as the shaft rotates, until it eventually engages the portion of the guideway closest to the shaft when the piston has reached the end of its stroke. The piston 6' shown at the bottom of FIGURE 1 has reached the outer end of its stroke, and it will be noted that the portion of the concave surface 30 immediately adjacent the ball 9 and socket 29 combination of this bottom piston engages the portion of the annular guideway closest to the shaft 2.

By arranging the guideway eccentrically in relation to the shaft and by utilizing a connecting means 5 universally mounted on the shaft 2, the piston stroke is shortened so as to reduce piston wear and increase the efficiency of the engine, but a good output torque characteristic of the engine is maintained. As the gases start to expand in the top cylinder 1 of FIGURE 1, the resulting pressure is transmitted to the inclined plate face 3b at a point on a plate which is at a substantial distance from the center of the power shaft 2. Thus when the piston 6 starts to move outwardly, the fact that the guideway 31 and swash plate face 3b are eccentric to the shaft 2 gives the effect of the plate being greater in diameter than it actually is in comparison with a concentrically arranged swash plate. As in all internal combustion piston engines, the pressure in the cylinders is greatest during the initial expansion and then falls off rapidly as the piston moves outwardly. The fact that the plate 3 is in such a position in the present invention that the pistons act on it at a point which is the maximum distance from the center of the shaft when the pressure in the cylinder 1 is at a maximum, results in a high output torque of the engine. Similar benefits are obtained during the compression stroke also since it can be seen that when the opposed pistons in a cylinder approach each other, which is, of course, the time when the new charge of air between the pistons is compressed to the greatest extent, the portion on the guideway 31 which is acting on the piston through the connecting means 5 is again approaching a maximum distance from the center of the shaft.

Although good torque characteristics are achieved for the reasons set out above, it can be seen from FIGURE 1 that the horizontal distance between the point on the plate 3 in alignment with the top piston 6 and the point on the plate in alignment with the bottom piston, which equals the length of the piston stroke, is less than if the plate was concentrically arranged on the shaft at the same angle and was of such a diameter as to provide a corresponding distance between the center of the shaft and the point on the plate on which the piston acts when the fluid in the cylinder commences to expand.

The elements for transforming the reciprocating movement of the pistons to the rotational movement of the power shaft, which include the connecting means 5, universal mounting means 34, and eccentric guideway 31 and swash plate 3, will also function in a swash plate motor which is not an opposed piston type. For example, only the right hand or left hand side of the motor as shown in FIGURE 1 could represent a complete motor in itself, it only being necessary to secure a head to the cylinders and to change the design of the valve means which controls the entrance and exhaust of the working fluid.

The same principle used to relate the linear movement of the pistons to the rotating movement of the shaft can be successfully utilized in a pump as well. By changing the design of the valve means and applying power to the shaft 2 the motor can function as a pump for pumping fluids. Similarly the motor could be adapted to be connected to a supply of pressurized fluid and operated as a fluid driven motor, or provided with spark plugs and operated as a spark ignition engine rather than a compression ignition engine.

What I claim as my invention is:

1. A motor of the swash plate type, comprising a power shaft, a plurality of cylinders disposed about said power shaft and spaced equidistantly therefrom in parallel relationship thereto, a swash plate fixed on an inclined angle to said shaft, an annular guideway on said plate about said shaft and eccentric thereto, said annular guideway having a guiding surface which is convex and substantially semi-circular in cross section, pistons adapted to reciprocate in said cylinders, valve means in each cylinder to permit the entrance and exit of a working fluid, piston rods universally connected at one end to said pistons, and connecting means journalled on said shaft for universal movement about its center with respect to said shaft and held against rotation about the axis of said shaft in relation to said cylinders, said connecting means being provided with an annular concave surface which is substantially semi-circular in cross section for cooperative engagement with the guiding surface of said annular guideway, said piston rods being universally attached on their outer ends to said connecting means, the axis of the eccentric annular guideway passing through the center of said connecting means whereby the linear reciprocating movement of the piston is related to the rotational movement of said shaft.

2. In a motor, a power shaft, a plurality of cylinders disposed about said power shaft and spaced equidistantly therefrom in parallel relationship thereto, two pistons arranged to reciprocate in each cylinder in an opposed manner, a separate piston rod universally connected at one end to each piston, the other end of said piston rods of the two pistons in each cylinder extending out of opposite ends of said cylinder, ports in each cylinder to permit the entrance and exit of a working fluid, two swash plates fixed on said power shaft at opposite ends of said cylinders and inclined towards one another, an annular guideway on each of said swash plates arranged about said shaft and eccentric thereto, and separate connecting means journalled on said shaft between each swash plate and the adjacent end of the cylinders for universal movement about their centers with respect to said shaft and held against rotation about the axis of said shaft in relation to said cylinders, each connecting means being provided with an annular concave surface which is substantially semi-circular in cross-section for cooperative engagement with the guiding surface of the adjacent annular guideway, said other ends of the piston rods extending out of the ends of said cylinders being universally attached at their outer ends to the adjacent connecting means, the axis of each eccentric annular guideway passing through the center of the adjacent connecting means whereby the linear reciprocating movement of the pistons is related to the rotational movement of the power shaft.

3. A motor as claimed in claim 1 wherein the connecting means is provided with mounting means between it and the power shaft, said mounting means including a spherical bearing surface and being concentrically and slidably mounted on said shaft, said connecting means having a concave shaped socket adapted to receive said spherical bearing surface, whereby universal movement is permitted between said connecting means and said mounting means.

4. A motor as claimed is claim 3 wherein said mounting means further includes a sleeve member, said sleeve member extending along the power shaft and having anchoring means to prevent said mounting means from turning with respect to said cylinder, and means being provided between said mounting means and connecting member to prevent said connecting member from rotating about the axis of said power shaft in relation to said cylinders.

5. A motor as claimed in claim 4 wherein the means for preventing rotation of said connecting means about the axis of said power shaft in relation to said cylinders comprises a plurality of cylindrical sockets extending into said spherical surface perpendicularly to the axis of said power shaft, a plurality of bar members of arcuate shape corresponding in curvature to the shape of said spherical surface and each having a stub shaft fixed in radial relationship thereto for accommodation in said cylindrical sockets so that each bar can fit over said spherical surface and swivel about its stub shaft, said concave shaped socket having a plurality of bar member receiving grooves extending in the same direction as the power shaft.

6. A motor as claimed in claim 4 wherein said sleeve member is hydraulically urged towards said swash plate whereby the connecting means is constantly biased against said guideway.

References Cited in the file of this patent

UNITED STATES PATENTS

| | | |
|---|---|---|
| 1,869,440 | Schlenker | Aug. 2, 1932 |
| 2,231,100 | Wahlmark | Feb. 11, 1941 |
| 2,475,295 | Sherman | July 5, 1949 |
| 2,513,083 | Eckert | June 27, 1950 |
| 2,702,483 | Girodin | Feb. 22, 1955 |
| 2,877,653 | Masnik et al. | Mar. 17, 1959 |